United States Patent

[11] 3,578,812

[72] Inventors Frederick Taussig Ladue;
Robert Gene Tanner, St. Charles, Mo.
[21] Appl. No. 803,853
[22] Filed Mar. 3, 1969
[45] Patented May 18, 1971
[73] Assignee Arundale Manufacturers, Inc.
St. Louis, Mo.

[54] SUPPORT WHEEL AND METHOD OF MAKING SAME
10 Claims, 5 Drawing Figs.
[52] U.S. Cl. .................................................. 301/63,
152/379, 264/230, 264/263
[51] Int. Cl. .................................................. B60b 5/02
[50] Field of Search ........................................... 152/323,
379, 7; 301/63, 5, 5.3, 5.7; 29/129.5, 132; 16/45;
264/263, 230

[56] References Cited
UNITED STATES PATENTS
700,509   5/1902   Knauber ...................... 301/5.3
954,048   4/1910   Price .......................... 301/63X
1,595,182  8/1926   Fravel ........................ 301/63DD
2,665,521  1/1954   Ford .......................... 301/63(PW)
FOREIGN PATENTS
240,075   8/1962   Australia ..................... 152/7
647,141   12/1950  Great Britain ................ 152/379

Primary Examiner—Richard J. Johnson
Attorney—Kingsland, Rogers, Ezell, Eilers & Robbins ABSTRACT: The inventions are a support wheel assembly and a method of making it. The support wheel comprises a central bearing, a circular elastic tire, and a plastic wheel interposed between the bearing and tire. The tire has opposite circular clincher grooves on its sides and locking knobs on its inner wall. The plastic wheel is molded around the bearing, into the grooves, and around the knobs.

The method involves locating the tire, and usually the bearing, as inserts in a mold cavity, the tire being compressed at opposite sides adjacent the rim, causing it to be temporarily reduced in width, and to bulge inward at the clincher grooves. Plastic to form the wheel is injected under pressure through at least three equally spaced gates in the hub portion of the mold cavity. The plastic flows around the bearing insert, if present, then outwardly to form a wheel web, until it strikes an arcuate inner wall of the tire. It is thereby evenly divided to flow outwardly and laterally to form the wheel rim. At the edge of the rim it is deflected laterally into the clincher grooves of the precompressed tire to form a circular clincher bead therein, and also around the edge of the rim to form a peripheral outer ridge. It flows around the knobs, or similar projections, on the inner wall of the tire and interlocks therewith.

The inward compression of the walls of the tire aids in preventing flow of the plastic up the sides of the tire, and, if the mold is designed in a manner herein disclosed, permits the formation of the ridges around the wheel rim adjacent the sides of the tire. A two-piece core and cavity mold is employed, the separations being located at the maximum outward extremes of the wheel, to vent air from the mold. Upon removal from the mold, the tire is snug on the wheel, and the wheel is shrunk or bonded to the bearing, if present.

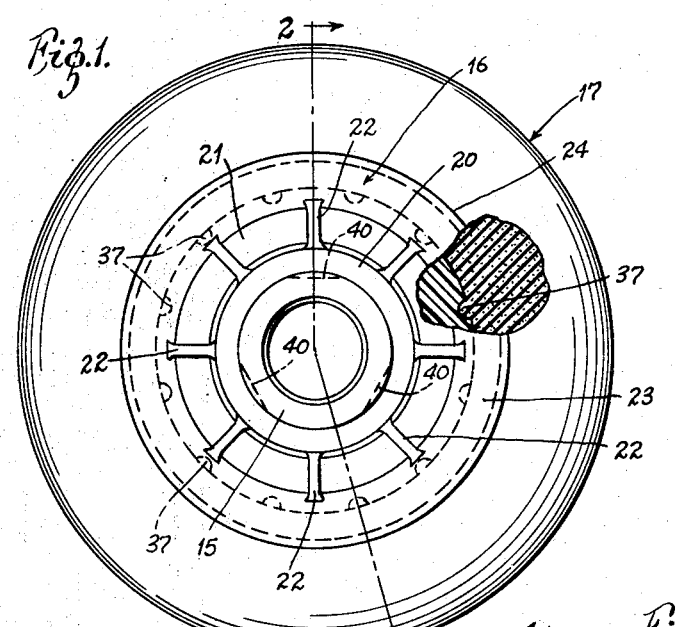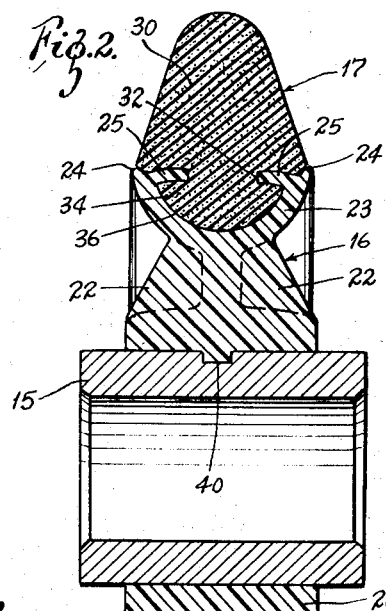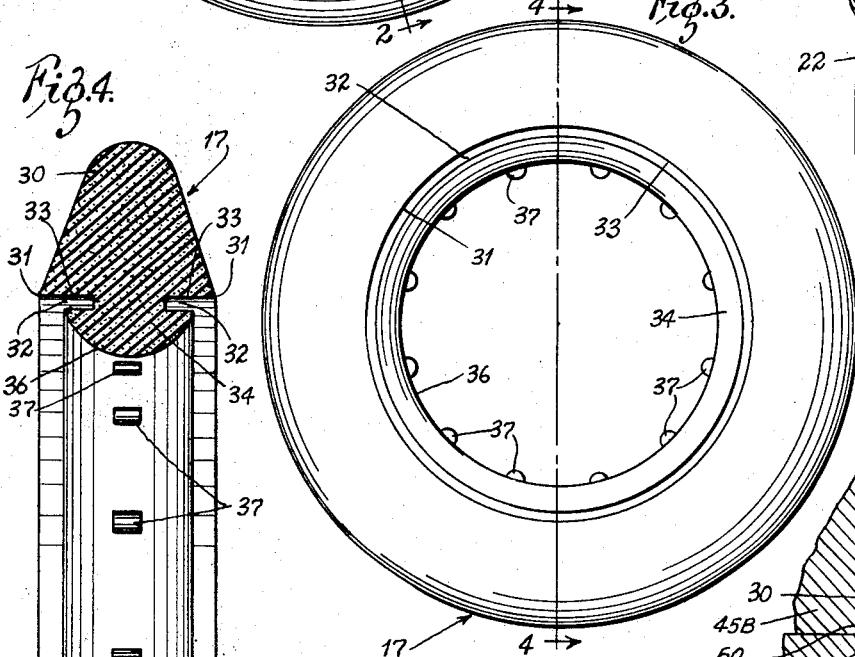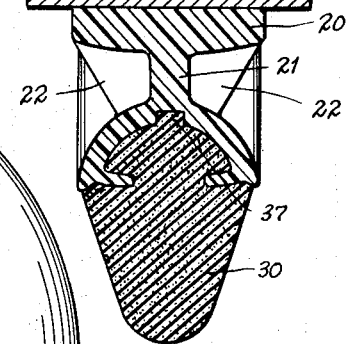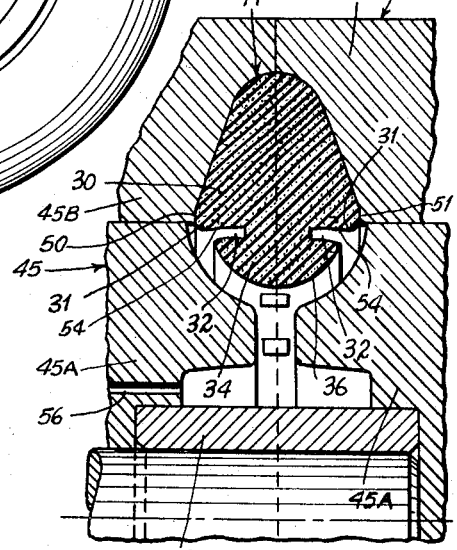
INVENTORS.
FREDERICK TAUSSIG,
ROBERT GENE TANNER,
BY Kingsland, Rogers, Ezell, Eilers & Robbins
ATTORNEYS

SUPPORT WHEEL AND METHOD OF MAKING SAME

BRIEF DESCRIPTION OF THE INVENTION

The invention consists of the article and the method that provide the rubber tire securely attached to the plastic molded wheel by peripheral clincher elements on the wheel rim engaging in slots around the sides of the tire, and by neat ridges extending outwardly at the lateral edges of the wheel rim, the foregoing with a small lateral precompression of the tire adjacent the ridges which aid in maintenance of the tire snugly on the wheel. There are knob and socket molded interlocks between tire and rim. Preferably the wheel is shrunk onto a bearing. The molding is performed in a manner to avoid air pockets, and the shape of the tire as an insert is such as to evenly distribute the plastic both laterally and outwardly, and to make the tire secure on the wheel.

Objects of the invention are to provide a support roller that can be used as not merely a support, but also as a drive wheel or an idler wheel, as required. It has a plastic wheel, an outer tire, and an inner bearing or inner bearing surface or a through core hole intended to receive a bearing, the two or three parts, as the case may be, being so effectively secured together that they cannot separate under operating conditions by either skid forces or lateral forces or radial forces or normal flexing of the tire under load.

IN THE DRAWINGS

FIG. 1 is a side view of the wheel assembly;

FIG. 2 is a diametrical section taken on the line 2–2 of FIG. 1;

FIG. 3 is a side view of the tire alone;

FIG. 4 is a diametrical section of the tire taken on the line 4–4 of FIG. 3; and FIG. 5 is a vertical section through a portion of the mold in which the assembly is formed, incorporating the tire and bearing inserts.

The support roller assembly as illustrated here consists of three principal parts. There is an inner cylindrical bearing 15, a plastic wheel 16 and a tire 17. The bearing can be made of any suitable material including plastics and metals, but preferably is of prelubricated porous iron. It must be strong enough to permit the injection molding of plastic around it as will appear. The plastic 16 may be any appropriate injection molding material. One useful material is 40 percent talc-filled polypropylene. The tire may be of a material such as urethane, neoprene or SBR, nitrile, S.C. 712B, El. Alternately it may be of injection molded rubber. The term "rubber" herein means natural or artificial rubber, or equivalent elastomer.

The plastic wheel 16 has an inner cylindrical hub 20 with a web 21 projecting outwardly therefrom and having a plurality of spokelike flanges 22 at spaced points around it. It is surrounded by a rim 23 of arcuate cross section. The peripheral edges of the rim 23 project as small lateral ridges 24. Tire-clinching flanges 25 on the opposite sides of the rim 23 project toward each other.

As shown in FIGS. 3 and 4, the tire 17, before being joined with the other parts, has an outer body portion 30 that is generally triangular in cross section, and rounded on its extreme outer edge to provide a contact part. Other shapes may be used. At the base of the main tire portion there are opposite edges 31 and opposite laterally extending grooves 32. The edges 31 will be disposed adjacent the rim ridges in the wheel assembly. The grooves are defined in part by inwardly extending shoulders 33 that form the inner surfaces of the body portion 30 of the tire. On its inner part, the tire has an integral locking holder 34 with laterally projecting edges defining the lower walls of the slots 32. The inner surface of the locking holder is preferably arcuate as shown at 36. The locking holder 34 is not as wide as the body 30. The locking holder 34 is preferably continuous around the tire as this affords greater strength and stability to the device. Under circumstances of light loads, the holder 34 may be discontinuous. It will be evident that the wheel flanges 25 lock into the slots 32 and the ridges 24 lie along the edges 31 of the tire, in a manner to be described more fully.

The tire also has a plurality of knobs or other projections 37 on its inner surface 36. The plastic wheel 16 is formed to provide sockets around the knobs 37 which thereby prevent any spinning or creeping of the tire about the wheel.

If the plastic in cooling and curing contracts about the bearing, the frictional lock therebetween may be adequate without further means to prevent slippage. However, if desired, one or more appropriate grooves, flats, or the like, as shown at 40, may be provided on the outer surface of the bearing and the plastic flowing thereinto will provide a mechanical interlock to insure that the hub will not move on the bearing circumferentially or laterally.

FIG. 5 shows a broken away portion of a mold that is used for practicing this process. The core and the cavity of the mold are both formed of two pieces. The core 45 incorporates an inner portion 45A and an outer portion 45B. These portions are designed to provide annular cavity components. The two-piece cavity mold is generally indicated at 48 and includes an inner section 48A and an outer section 48B. The core 45 and cavity 48 are preferably symmetrical, other than so as to provide for plastic gating and for ejection mechanism.

In practicing the process hereof, the separate bearing 15, if used, is disposed in the mold as an insert, the mold having recesses in its core and cavity to receive and stabilize the bearing, as illustrated. The bearing may, if desired, be located on a mandrel which in itself is fitted with stability into the mold.

The rubber tire 17 is also disposed in the mold as an insert. The body portion 30 of the tire fits snugly within the outer portion of the cavity of the closed mold. The mold has opposite flat portions 50 and 51 in the core and the cavity, respectively, that engage the lower sides of the main body portion 30 of the tire adjacent the corners 31 and compress such portions of the tire inwardly. Typically, (but without limitations), the outer diameter of the tire may be about 3.127 inches; the diameter of the shoulders 33 may be 2.068 inches; the inner walls of the slots 32 may be 1.940 inches in diameter; and the minimum inner diameter of the attaching flange may be 1.700 inches. The maximum width of the tire at the edges 31, when the tire is uncompressed, can be 0.620 inches. The maximum distance between the flats 50 when the mold is closed can typically be 0.560 inch. These dimensions are subject to appropriate tolerances.

As shown, this compression of about 0.060 inch causes the rubber to flow, since it is substantially incompressible, and as a result, it is caused to bulge inwardly as shown at 54 on the shoulders 33.

Gating of the mold is provided typically at three equally spaced points 56 around one face of the hub portion 20 of the mold so that the plastic is injected for even flow around the wheel. This is the preferred gating especially where a bearing insert is used. Other gating can be used but should be multiple and symmetrical around the wheel. The injected plastic engages over the bearing 15, is present, and flows outwardly in the web portion 21 and the spokes 16. When it strikes the curved inner surface 36 of the tire, it is diverted evenly by the shape of the surface in opposite directions laterally and outwardly along this surface within the cavity. It flows outward to form the ridges 24 but is restrained from flowing beyond to form an undesired flash by the great compression of the flats 50 and 51 against the tire and consequent seal between them. The plastic flows laterally into the slots 32 on opposite sides of the tire, filling around the bulges 54.

The ridges 24 always extend to or alongside the body of the tire despite some shrinkage of the plastic upon cooling and curing. A neat outer edge of the wheel always occurs because the inner face between the mold and the tire insert is not located there, but is laterally inward therefrom so any flashing is not on this exposed edge. Also the compression of the tire tightly against the mold reduces the chances of producing a flashing between them. Shrinkage of the plastic material will not destroy the interlock of the wheel in the slots 32, or leave a gap visible between tire and wheel. Also the plastic flows around the spherical projections 37 which produce spherical recesses in the plastic wheel, providing in the finished product plug and socket interlocks, so that the tire cannot slip around the wheel.

It will be seen that the parting surfaces between the two inner and outer sections of core and cavity portions of the mold occur adjacent the edges 31. It also can be seen that these are the areas to which air is most likely to be driven by the inflow of the plastic. Consequently, air can escape through these parting surfaces and not interfere with the filling of the mold with plastic.

We claim:

1. In a support roller of the kind described having an annular rubber tire attached to the outside of a plastic wheel and means to hold the tire and wheel together; the tire having a body portion and an attaching holder portion integral with and projecting inwardly from the body portion; the tire having circular grooves around it defining the body portion and the holder portion, and defining bottom walls for the body portion, the tire in its initial uncompressed state having corners adjacent the grooves, which corners are modified as hereinafter set forth; the attaching holder portion projecting inwardly from the bottom walls, and itself having laterally extending attaching flanges inwardly spaced from the shoulder walls of the body portion, and defining the other walls of the slots around the opposite sides of the tire, the inner walls of the attaching portion extending laterally and outwardly; the wheel having a hub and radially extending parts extending therefrom, and wheel-attaching means outwardly of the radially extending parts comprising a rim extending outwardly and laterally to conform to the inner wall and the outward and lateral portions of the tire attaching holder portion; the wheel attaching means also having integral laterally projecting portions in the circular grooves of the tire to clinch the tire onto the wheel, the tire being initially compressed at the sides of its body portion and bulging inwardly in the bottom walls of the body portion at the corners, the wheel portions in the slots conforming to said bulging, and the wheel rim having opposite ridges extending outwardly generally radially and laterally of the compressed corners of the tire, to aid in conforming the tire to the wheel against lateral movement of the tire relative to the wheel and to aid in lateral covering of any spacing between the plastic wheel and the tire upon contraction of the wheel relative to the tire.

2. In the roller of claim 1: the tire being symmetrical in cross section, and the attaching means on the wheel being symmetrical in cross section.

3. In the roller of claim 1: the inner wall of the tire attaching holder, and the part of the wheel adjacent thereto, having interfitting plug and socket means to resist spinning of the tire about the wheel.

4. In a method of making a roller, the steps of: inserting into a mold cavity an annular rubber tire having a body portion, the mold cavity being substantially complementary in size and shape to the body portion of the tire but slightly narrower than the said body portion, circular grooves around the opposite sides of the body portion of the tire providing shoulder walls to the body portion, and an attaching portion on the tire having laterally extending attaching flanges spaced from the shoulder walls and the attaching portion having an inner wall extending laterally and outwardly to the lateral edges of the attaching flanges; compressing the sides of the tire in the mold laterally together outwardly of the grooves thereby causing the rubber to bulge the shoulder walls, and to tightly engage the walls of the mold; forming a wheel attached to the tire, by the steps of injecting a plastic material into the mold cavity adjacent the inner part thereof to form a hub, continuing injection to cause the plastic to flow radially outwardly to strike the inner wall of the tire-attaching means, and be oppositely deflected outwardly and laterally thereby, and then inwardly of the circular slots to clinch the tire to the wheel, the plastic being restrained from outflow between the mold and sides of the tire by the compressive engagement of the mold and the tire; and forming generally radially extending ridges around the wheel adjacent and engaging the compressed sides of the body portion of the tire.

5. In the method of claim 4: the steps of providing means on the inner wall of the tire to interfit by a plug and a socket engagement with the injected plastic to interlock the wheel and the tire against relative spinning.

6. In the method of claim 4: the steps of simultaneously injecting the plastic through at least three gates spaced substantially evenly around or within the hub portion of the wheel.

7. In the method of claim 4: the steps of inserting a generally cylindrical bearing at the center of the mold cavity, and thereafter injecting the plastic as aforesaid to form the wheel about the bearing.

8. In the method of claim 7: the steps of causing the plastic to interflow with portions of the bearing surface to provide a plug and socket interlock between the wheel and bearing.

9. In the method of claim 4: the steps of providing lateral air escapement adjacent the opposite sides of the body portion of the tire at the points of compression, to aid in filling of the mold cavity by the plastic.

10. In the method of claim 9: the steps of forming the mold cavity in two-piece core and two-piece cavity parts, joined against the slots in the tire, to provide the air escapement.